July 5, 1960 R. W. QUIRK 2,943,852

RAPID ACCELERATION DRIVING MECHANISMS

Filed July 1, 1955 2 Sheets-Sheet 1

INVENTOR,
ROBERT W. QUIRK

BY Henry Heyman
ATTORNEY

July 5, 1960 R. W. QUIRK 2,943,852

RAPID ACCELERATION DRIVING MECHANISMS

Filed July 1, 1955 2 Sheets-Sheet 2

INVENTOR,
ROBERT W. QUIRK

BY Henry Heyman
ATTORNEY

United States Patent Office 2,943,852

Patented July 5, 1960

2,943,852

RAPID ACCELERATION DRIVING MECHANISMS

Robert Warren Quirk, Los Angeles, Calif., assignor to Hughes Aircraft Company, Culver City, Calif., a corporation of Delaware Filed July 1, 1955, Ser. No. 519,324

5 Claims. (Cl. 271—2.3)

This invention relates to rapid acceleration driving mechanisms and more particularly to a driving mechanism for substantially instantaneously accelerating an elongated recording medium from rest to a predetermined constant high velocity.

In recording and reproducing apparatus it is conventional to employ fixed recording and reproducing transducers and a moving recording medium. During both recording and reproducing, the recording medium is moved past the corresponding transducer at a constant predetermined velocity. If high quality recording and reproduction is to be obtained, it is essential that a constant velocity of the recording medium past the transducers be maintained during recording and reproducing. Any acceleration or non-uniform motion of the recording medium past the recording transducer results in distortion when the recorded material is reproduced.

In recording apparatus employing elongated recording media, such as a tape or wire, an additional problem is encountered. Because of the great length of recording material conventionally used in such apparatus, it becomes essential to employ means for stopping and starting the recording medium at any desired interval along its length. Thus recording apparatus utilizing an elongated recording medium must provide means for moving the recording medium past the transducer employed in the apparatus at a constant velocity during both recording and reproducing, and further provide means for stopping and starting the travel of the recording medium at any point along its length. To accomplish this, it is conventional to employ a heavy drive roller or capstan which is continuously rotated by a synchronous motor or other dependable driving means. Because of the mass of the drive roller, a fly-wheel effect is attained insuring a constant angular velocity to provide a peripheral velocity equal to the desired linear velocity of the recording medium.

The peripheral surface of the drive roller is usually highly polished to provide a comparatively frictionless surface. The elongated recording medium is supported to lightly touch a portion of the substantially frictionless surface of the drive roller. Due to the comparatively frictionless contact of the recording medium with the highly polished peripheral surface of the rotating drive roller, the longitudinal force imparted to the recording medium at the point of contact with the drive roller is more than overcome by the inertia of even the lightest recording medium. As a result, the recording medium remains at rest.

When it is desired to accelerate the recording medium to the velocity of the peripheral surface of the drive roller, the frictional force developed between the recording medium and the surface of the drive roller is rapidly increased by pressing the recording medium against the drive roller by a freely rotating idler or jam roller. As a result the recording medium is squeezed or pinched between opposite surfaces of the drive and jam rollers. The friction developed between the surface of the recording medium in contact with the surface of the drive roller is increased to a value sufficient to completely overcome the inertia of the recording medium, thus causing the recording medium to travel at a velocity equal to the constant peripheral velocity of the drive roller. Where it is desired to selectively move the recording medium in a forward or reverse direction, two drive rollers and two associated idler or jam rollers are employed, the drive rollers being rotated in opposite directions. The recording medium is in contact with the peripheral surfaces of both rollers. Each drive roller is thereby adapted, by pressing the associated jam roller against its peripheral surface, to move the recording medium such as a tape in a selected one of two directions. Typical driving mechanisms of the above classes, for magnetic tape and wire recording media, are fully discussed and illustrated in a book, entitled "Magnetic Recording," by S. J. Begun, pages 135–179, published by Rinehart Books, Inc., Technical Division, New York, January 1951.

The above described driving mechanisms for moving a tape past a fixed transducer is comparatively satisfactory where the time required for accelerating the tape from rest to its constant velocity is not critical. However, where the acceleration time or period becomes an important factor this system for driving a recording medium has inherent disadvantages. For example, recording apparatus utilized in conjunction with digital computing systems must store an exceedingly large amount of material as the quantity of data needed by these computers for the solution of even comparatively simple problems is large. In addition, any desired portion of the data stored in the recording apparatus must be rapidly available for the computer upon demand in order to reduce the idle time of the computer. Due to the large amount of information stored and the necessity for selective reproduction of desired portions thereof during any given operational period of the computer, elongated recording media, such as plastic or paperback magnetic tapes, are usually employed in the associated recording apparatus.

During the solution of a problem by the computer, selected portions of the recorded information must be recorded or reproduced and information provided by the computer must be recorded on selected areas along the recording tape. Thus, the recording tape must be stopped and started at frequent intervals at different points along its length. It is apparent, therefore, that the time consumed in accelerating the tape from rest to its normal velocity is lost time, since accurate recording and reproduction is possible only during the time the tape is moved at the velocity required for both recording and reproduction. In addition, the length of the tape which is moved past the transducers during each acceleration or deceleration period represent unused portions of the tape and therefore constitutes waste. In order to prevent accumulation of idle computer time and to make possible the efficient use of the entire length of the recording tape, therefore, it becomes essential to reduce to a minimum the acceleration time necessary to bring the tape from rest to its predetermined constant velocity.

It is apparent that the acceleration time utilized in bringing the tape from rest to a predetermined constant velocity is needed to overcome the inertia of the tape and the inertia of the driving mechanism which must change their velocity during the acceleration period.

In the past, the inertia of the tape has been reduced to a convenient minimum by utilizing extremely light weight tapes possessing the added advantageous characteristic of a comparatively "slick" or frictionless surface. For example, magnetic tapes have been developed utilizing an extremely light weight paper or plastic backing having a light coating of magnetic oxide material. Thus, by utilizing smooth running surfaces for guiding the tape, the inertia of the tape becomes comparatively insignificant.

Past attempts to reduce the inertia of certain elements of the driving mechanism have not been so successful. The inertia that must be overcome in bringing the jam roller from rest up to the peripheral velocity of the associated drive roller during the acceleration period has been found to be the most important contributing factor to the length of the acceleration period. In order to reduce the inertia of the drive roller attempts have been made to utilize light-weight materials such as nylon, Bakelite, or other composition material in the construction of the jam roller thereby reducing its overall weight. In each case, however, the reduction in mass or specific gravity has resulted in a sacrifice of hardness and rigidity. Such light-weight materials cannot be machined with the precision of metals and in addition are insufficiently strong to press firmly against the hardened peripheral surface of the drive roller or capstan without excessive wear. Due to the inevitable non-homogeneous structure of such composition matter uneven wear is encountered causing the surface of the jam roller to become oblong or wavy. When it is remembered that the slightest irregularity in velocity of the tape is greatly amplified by the transducer, the necessity for utilizing a highly true jam roller is apparent. Because of the great velocities ordinarily encountered in tapes for this purpose, it is evident that efficient bearings must be employed in the jam roller. Thus, even though the basic material of the jam roller is reduced in weight, bearings having an irreducible minimum weight must still be employed.

It is, therefore, an object of the present invention to provide a driving mechanism for substantially instantaneously accelerating an elongated recording medium from rest to a predetermined constant velocity.

It is a further object of the present invention to provide a rapid acceleration driving mechanism for substantially instantaneously accelerating a tape from rest to predetermined constant velocity which is highly efficient, reliable, extremely durable, and long lasting.

It is another object of the present invention to provide a rapid acceleration driving mechanism of the class referred to for selectively accelerating a tape from rest to a predetermined constant velocity past a transducer in either of two directions.

A further object of the present invention is to provide a driving mechanism for substantially instantaneously accelerating a magnetic tape from rest to a constant predetermined velocity which employs a hard metal core jam roller which may be heavy.

In accordance with the basic concepts of the present invention an elongated recording medium such as a magnetic tape is substantially instantaneously accelerated from rest to a predetermined constant velocity by a driving mechanism employing a constant momentum jam roller associated with a constant momentum drive roller. This is accomplished by utilizing a continuously rotating drive roller and a continuously rotating jam roller, the angular velocity of both the drive roller and the jam roller being maintained constant at all times. Since the angular velocity of the drive and jam rollers remain constant throughout the rest, acceleration, and running periods of the tape, no change in momentum of these elements during the acceleration period is required. As a result the inertia of the tape becomes the only remaining factor contributing to the length of the acceleration period and light-weight tapes suitable for this purpose are well known.

In accordance with the embodiment of the present invention the jam roller is in continuous contact with the drive roller in both the rest and the running positions. Thus, the jam roller derives its energy of rotation directly by its continuous contact with the continuously rotated drive roller, the jam roller rotating freely on its axis.

Alternatively, a freely rotatable jam roller, a rotated drive roller, and a rotated back roller are employed. The drive roller and the back roller are spaced apart from each other. The tape rests in light contact with the peripheral surface of the drive roller. The jam roller alternatively assumes two spaced positions, a tape-rest position in pressure contact with the back roller and a tape-running position where the jam roller is pressed against the drive roller thus squeezing the recording medium between the opposing peripheral surfaces of the jam roller and drive roller.

For a better understanding of the invention, together with other and further objects thereof, reference is made to the following description, taken in connection with the accompanying drawings, and its scope will be pointed out in the appended claims.

Figure 1:
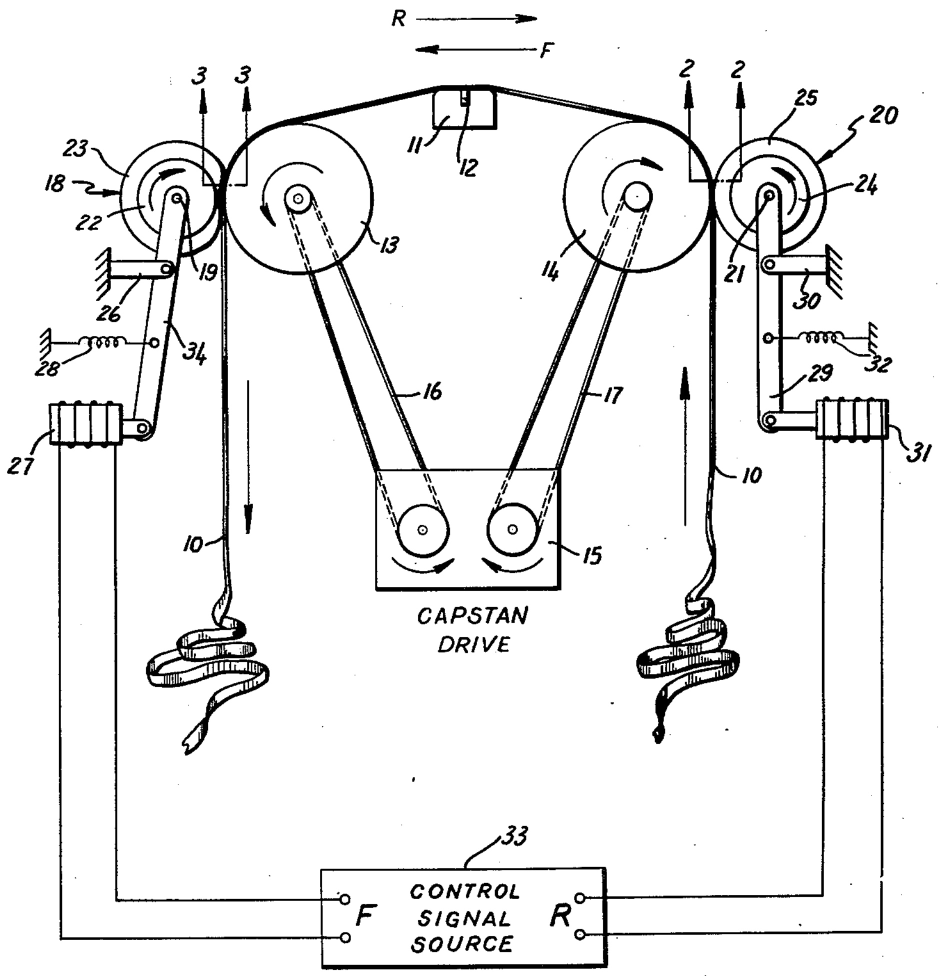
Fig. 1 is a diagrammatic elevational view of a first embodiment of the drive mechanism of the present invention adapted to substantially instantaneously accelerate an elongated tape from rest to a predetermined constant velocity in either of two directions past a transducer.

Reference is now made to the drawings wherein like parts are identified throughout by like reference numerals. Fig. 1 illustrates an embodiment of the drive mechanism of the present invention for substantially instantaneously accelerating an elongated recording medium such as a tape 10 from rest to a predetermined constant velocity in either a forward or a reverse direction, as indicated by arrows F and R, respectively, past a transducer housing 11 containing a transducer head 12. Tape 10 is suspended over the upper peripheral surface of a first or forward drive roller 13, transducer housing 11, and a second or reverse drive roller 14. Although it will become apparent from the ensuing description that the mechanism of the present invention is not so limited, it is assumed for purposes of illustrating the present invention that it is desired to move tape 10 in the reverse direction at the same velocity as in the forward direction. To accomplish this, drive rollers 13 and 14 are identical and are continuously rotated at constant and equal angular velocities. Drive roller 13 is rotated in a counter-clockwise and drive roller 14 in a clockwise direction, as indicated by arrows, by means of drive belts 16 and 17, respectively, from a common capstan drive 15. The outer peripheral surfaces of the drive rollers 13 and 14 are highly polished to provide a substantially frictionless contact with the lower surface of tape 10.

In continuous contact with the first drive roller 13 is a first or forward jam roller 18 freely rotating on a shaft 19. Similarly, a second or reverse jam roller 20, identical to jam roller 18, freely rotates on a shaft 21 and is in continual contact with the second drive roller 14. Jam roller 18 includes an inner rigid drum or roller 22 and an outer resilient collet 23. Similarly jam roller 20 has an inner rigid drum 24 and an outer resilient collet 25.

Jam rollers 18 and 20 are each selectively positionable in a first and a second position hereinafter referred to as the tape-rest and the tape-running positions, respectively. In the tape-rest position, the jam roller is lightly pressed against its associated drive roller with just sufficient force to cause the jam roller to rotate on its axis at a peripheral velocity equal to the peripheral velocity of the drive roller. In the tape-running position the jam roller is firmly pressed against the drive roller with sufficient force to compress or distort, in a manner to be explained, the resilient peripheral collet of the jam roller in contact with the drive roller as both rollers rotate in unison. In Fig. 1, for example, forward jam roller 18 is illustrated in its tape-running position, i.e., it is firmly pressed against the peripheral surface of the forward drive roller 13 thereby distorting or compressing the resilient peripheral collet 23 at the points of contact. In contrast, reverse jam roller 20 is illustrated as lightly pressed against the peripheral surface of its associated reverse drive roller 14, and is illustrated, therefore, in the tape-rest position.

It should be emphasized, however, that in accordance with the basic concepts of the present invention the jam and drive rollers of both the forward and reverse acceleration rollers are maintained at a substantially constant angular velocity at all times. More particularly, each of the jam rollers continuously rotates in both the rest and running positions at a peripheral velocity equal to the peripheral velocity of the associated drive roller with which the jam roller is in continuous contact. Thus each jam roller maintains the same rotational momentum at all times regardless of whether it is in the rest or running position.

The jam rollers 18 and 20 are selectively positioned in either the rest or the running position by a separate electromagnetic solenoid operating upon an associated spring-tensioned linkage. To this end the position of jam roller 18 is controlled by a forward control comprising a linkage 34 which is pivoted on a fulcrum 26 and is subject to a clockwise torque developed by the force exerted by an anchored spring 28 and also by the selectively applied force of an electromagnetic solenoid 27. Similarly jam roller 20 is positioned by a reverse control comprised of linkage 29 pivoted on a fulcrum 30 and subject to a counter-clockwise torque developed by the force of an anchored spring 32 and the selectively applied force of an electromagnetic solenoid 31.

Whenever either of the solenoids 27 or 31 is energized, the associated linkage is subjected to sufficient torque about its fulcrum, resulting from the combined force exerted on the link by the associated solenoid and anchored spring, to cause the corresponding jam roller to assume the tape-running position. Conversely, whenever either of the solenoids 27 or 31 is de-energized, the corresponding jam roller assumes the rest position, the associated anchored spring exerting just sufficient force to lightly press the jam roller against the corresponding drive roller to maintain the jam roller rotating. For example, when solenoid 27 is energized as illustrated, the combined force exerted on linkage 34 by solenoid 27 and anchored spring 28 develops a clockwise torque on linkage 34 of sufficient magnitude to cause jam roller 18 to assume the tape running position. When solenoid 27 is de-energized, the outer resilient surface 23 of jam roller 18, which was formerly pinched or distorted between the opposing peripheral surfaces of the inner roller 22 of the jam roller and the drive roller 13, will spring back to its undistorted normal shape and thus assume the rest position, the force applied by anchored spring 28 being insufficient to equalize the opposing force developed by the resilient surface 18 of the jam roller. In a similar manner the position of jam roller 20 is selectively controlled by the energization of solenoid 31.

Solenoids 27 and 31 are each selectively energized by forward and reverse control signals, respectively, developed by a control signal source 33, which selectively develops a signal at either a first pair of forward output terminals F or a second pair of reverse output terminals R. The winding of solenoid 27 is connected to terminals F and the winding of solenoid 31 is connected to terminals R. The control signal source 33 is arranged so that when a potential is developed at terminals F no potential is developed at terminals R and vice versa.

Figure 2:
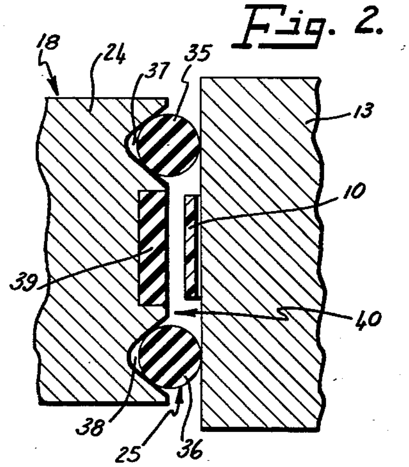
Fig. 2 is a section on line 2—2 of Fig. 1 illustrating the peripheral surfaces of a jam roller and its associated drive roller when the jam roller is in the tape-rest position.
Figure 3:
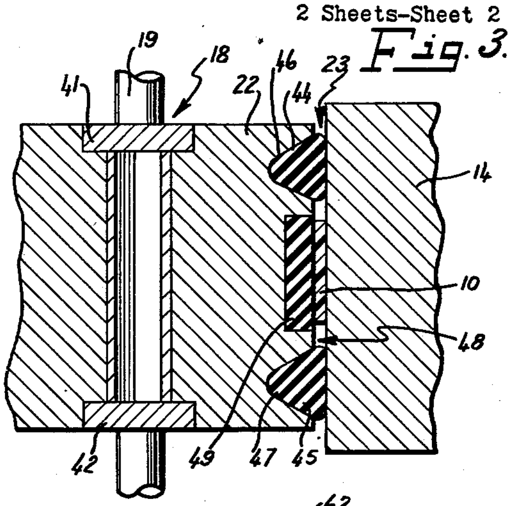
Fig. 3 is a section on line 3—3 of Fig. 1 illustrating the relative positions of the opposing peripheral surfaces of the jam roller and its associated drive roller when the jam roller is in the tape-running position.

Referring now to Figs. 2 and 3, the outer collets 23 and 25 of jam rollers 18 and 20, respectively, are each comprised of a pair of resilient or elastic rings or tires, resting under slight tension, in two corresponding V-shaped grooves cut around the circumference of the inner rigid drum of the corresponding jam roller. Accordingly, identical resilient tires 35 and 36 rest in similarly constructed V-shaped grooves 37 and 38, respectively, cut around the peripheral surface of rigid inner drum 24. In addition, a pressure pad of resilient elastic material 39 is firmly embedded in a suitable recess disposed around the outer circumference of drum 24.

The grooves 37, 38 are spaced to provide a sufficient distance between tires 35 and 36 to allow tape 10 to rest between them on the surface of drive roller 13. In addition, the tires 35 and 36 have sufficient cross-sectional diameter to extend beyond the plane of the peripheral edge of band 39 a height greater than the thickness of the magnetic tape 10. Thus a rectangular opening 40, is formed between the opposing surfaces of jam roller 18 and drive roller 13 of sufficient width and depth to permit tape 10 to rest lightly on an air cushion formed on the moving surface of drive roller 13 free from contact with any portion of the jam roller as shown in Fig. 2.

As previously discussed, when either of the jam rollers 18 or 20 is in its tape-running position, such as jam roller 18, in Fig. 1, the outer collet of the jam roller is distorted or squeezed between the opposing surfaces of the inner drum of the jam roller and the associated drive roller. This is clearly illustrated in Fig. 3 wherein jam roller 18, rotating on its shaft 19 and including bearings 41 and 42, is illustrated in its running position firmly pressed against drive roller 14. Similar to jam roller 20 of Fig. 2, jam roller 18 includes two annular elastic tires 44 and 45 normally having a circular cross-section and resting in corresponding V-shaped grooves 46 and 47 provided in the circumference of rigid inner drum 22, and further includes a pressure pad 49 firmly imbedded in a recess around the peripheral surface of the inner drum. Thus when jam roller 18 is in the rest position, a rectangular opening is formed between the opposing surfaces of jam roller 18 and drive roller 14, similar to the rectangular opening 40 of Fig. 2, permitting tape 10 to rest lightly on an air cushion formed on the moving surface of drive roller 14 free from contact with jam roller 18.

In Fig. 3, however, jam roller 18 is in the tape-running position and the outer resilient collet of the roller 18 is accordingly distorted or squeezed between the opposing surfaces of the inner rigid drum 25 and the drive roller 14. As a result, the normally round, annular tires 44 and 45 are flattened into their corresponding grooves 46 and 47 as illustrated thus causing a corresponding reduction in depth of the rectangular opening 48 between the opposing surfaces until tape 10 is firmly squeezed between the opposing surfaces of pressure pad 49 and drive roller 14.

Each of the jam rollers 18 and 20 of Fig. 1, therefore, is in constant engagement with its associated drive roller regardless of whether the jam roller is in the rest or in the running position. Since each of the jam rollers is freely rotatable on its shaft, it is rotated by its associated drive roller at a constant peripheral velocity equal to the peripheral velocity of the drive roller.

The outer surfaces of drive rollers 13 and 14 are highly polished to provide low-friction contact with the lower surface of tape 10. Initially, both jam rollers 18 and 20 are positioned in the rest position by de-energizing solenoids 27 and 31. Tape 10 is then threaded over transducer housing 11 and drive rollers 13 and 14 in a manner to rest within the rectangular opening formed between the surfaces of each drive roller and its associated jam roller and on the surfaces of drive rollers 13 and 14 free from contact with jam rollers 18 and 20. As a result, light frictional forces, equal in magnitude but opposite in direction, act on the tape thereby putting a slight tension on the portion of the tape between the two drive rollers while the tape remains at rest. By proper machining of the surfaces of the drive rollers this slight tension on the tape may be made just sufficient to cause tape 10 to maintain optimum pressure contact with transducer housing 13.

When it is desired to put tape 10 into motion in the forward direction, solenoid 27 is energized by control signal source 33 thereby causing forward jam roller 18 to assume the tape-running position. As previously explained tape 10 will be squeezed between the opposing surfaces of the forward acceleration rollers thereby pulling the tape in the forward direction. This force is many times the magnitude of the opposing light frictional forces developed by the contact of tape 10 with the peripheral surface of drive roller 14, since jam roller 20 remains in the rest position. Consequently, the tape will be rapidly accelerated in the forward direction from rest to a constant velocity equal to the constant peripheral velocity of drive roller 13.

When it is desired to stop tape 10, solenoid 27 is de-energized permitting jam roller 18 to again assume the tape-rest position. Jam rollers 18 and 20 now both being in the rest position, the opposing frictional forces developed on tape 10 by drive rollers 13 and 14 once more become equal in magnitude causing tape 10 to come to rest. Tape 10 is accelerated in the reverse direction, by energizing solenoid 31 from the control signal source 33 thereby causing jam roller 20 to assume the tape-running position. The resulting force acting on tape 10 in the reverse direction as the tape is squeezed between the opposing peripheral surfaces of the reverse rollers will result in a rapid acceleration of the tape from its rest position to a constant velocity in the reverse direction. De-energization of solenoid 31 will again result in tape 10 coming to rest.

As previously mentioned, the embodiment of the drive mechanism of Fig. 1 is adapted to accelerate tape 10 from rest to a predetermined constant velocity in either the forward or reverse direction. Obviously where it is desired to move the tape in the forward direction at a different velocity from that in the reverse direction, the peripheral velocities of drive rollers 13 and 14 may be adjusted accordingly. For example, if it is desired to move tape 10 at a greater velocity in the reverse direction than in the forward direction, the peripheral velocity of drive roller 14 must be proportionally greater than the peripheral velocity of drive roller 13. This may be accomplished by either increasing the angular velocity or the diameter of drive roller 14.

Figure 4:
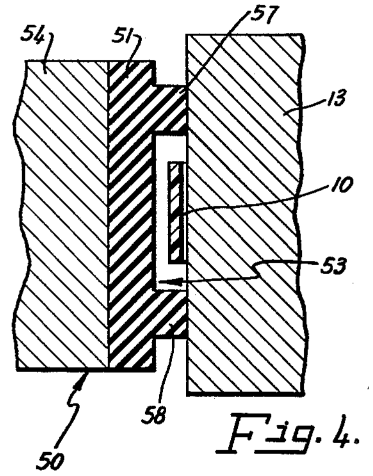
Fig. 4 is a sectional view similar to Fig. 2 illustrating a modified jam roller adapted to be used in the mechanism of Fig. 1 and showing the relative positions of the jam roller and its associated drive roller when in the tape-rest position.

From the foregoing discussion, it is apparent that various modifications of jam rollers 18 and 20 are possible. A modified jam roller 50 is illustrated in Fig. 4 in its rest position wherein the outer resilient peripheral collet 51 of the roller is in light contact with the peripheral surface of drive roller 13. Similar to the rollers of Fig. 2, a rectangular opening 53 is formed between the opposing surfaces of the jam and drive rollers 50, 14 through which tape 10 freely passes without contact with the surface of the collet 51. Unlike jam roller 20 of Fig. 2, however, jam roller 50 of Fig. 4 includes two extrusions of elastic material 57 and 58 spaced parallel around the circumference of the roller. Although illustrated in the figure as directly cut from the elastic material of the collet 51, these extrusions may alternatively be separate bands of elastic material affixed to the surface of the jam roller 50.

Figure 5:
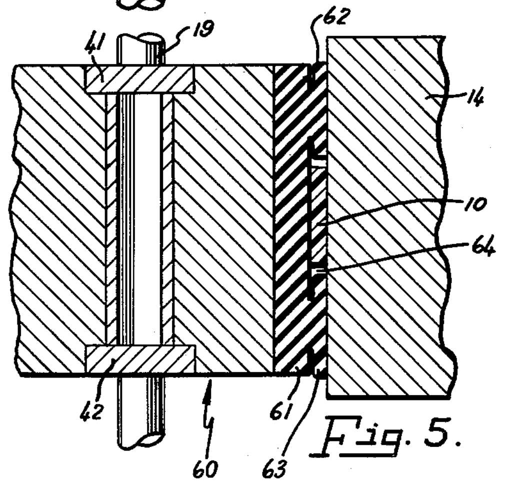
Fig. 5 is a sectional view similar to Fig. 3 illustrating the modified jam roller of Fig. 4 and the relative positions of the jam roller and its associated drive roller in the tape-running position.

Jam roller 60 of Fig. 5 is identical in structure to jam roller 50 of Fig. 4 and is freely rotatable about shaft 19 on bearings 41 and 42. Jam roller 60 is illustrated in the tape-running position wherein the pressure engagement of the jam roller against the peripheral surface of its associated drive roller 14 results in a compression of extrusions 62 and 63 as illustrated. This results in a corresponding reduction in width of the normally rectangular opening 64 through which tape 10 freely passes when jam roller 60 is in the tape-rest position. The width of the rectangular opening 64 is reduced until tape 10 is squeezed between the opposing surfaces of jam and drive rollers 60, 14.

Figure 6:
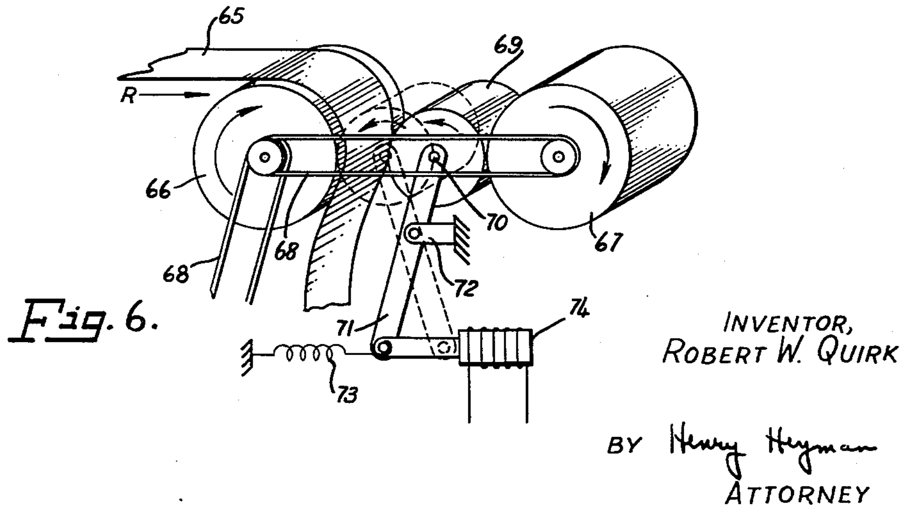
Fig. 6 is a perspective view of another driving mechanism in accordance with the present invention.

An alternative embodiment of the drive mechanism of the present invention is illustrated in Fig. 6 adapted to accelerate a tape 65 from rest to a predetermined constant velocity in the direction indicated by the arrow R in response to an electrical potential applied to a solenoid 74. The mechanism of Fig. 6 includes a drive roller 66 and a back roller 67 which are both continuously rotated in a clockwise direction, as indicated by the arrows, by means of driving belts 68 which transmit energy from a driving source not shown. In addition, the driving mechanism illustrated includes a drum-shaped jam roller 69 freely rotatable on a shaft 70 which is affixed to the upper extremity of a linkage 71. The linkage 71 is pivoted on a fulcrum 72 and subject to a torque in the clockwise direction by a force exerted on the lower extremity of the linkage by an anchored tension spring 73. In addition, linkage 71 is subject to a counter-clockwise torque about fulcrum 72 by the selectively applied force of solenoid 74.

When solenoid 74 is de-energized as shown, the clockwise torque developed on linkage 71 by spring 73 causes jam roller 69 to lightly press against back roller 67, this position of jam roller 69 being herein referred to as the tape-rest position. When solenoid 74 is energized, the resulting counter-clockwise torque developed on linkage 71 overcomes the torque exerted by spring 73. As a result, jam roller 69 is rapidly moved from the tape-rest position, indicated by solid lines, to the tape-running position, indicated by dotted lines, thus firmly pressing against drive roller 66.

In accordance with the concepts of the present invention, it is essential that no increase in momentum of jam roller 69 be required during the acceleration period of tape 65. It will be apparent, however, that any necessary decrease in momentum of the jam roller during the acceleration period will not increase the length of the period. Back roller 67, therefore, is rotated in the same direction as drive roller 66 at a peripheral velocity equal to or greater than the peripheral velocity of drive roller 66. By means of suitable bearings, jam roller 69 may be made to freely rotate on shaft 70 with a minimum of friction thereby making it possible for jam roller 69 to substantially maintain its momentum during its rapid transition from the tape-rest to the tape-running position. By experimentation the loss in momentum encountered by the jam roller during its travel from the rest to the running position may be compensated for by a corresponding increase in the peripheral velocity of back roller 67. Assuming back roller 67 is of the same diameter as drive roller 66, the conventional expedient of a smaller pulley on back roller 67 than on drive roller 66 will provide this increased peripheral velocity. Alternatively, back roller 67 may be of larger diameter than drive roller 66.

Tape 65 is initially placed over drive roller 66 when solenoid 74 is de-energized causing jam roller 69 to assume the tape-rest position against back roller 67. Due to the light mass of tape 65 and the smooth surfaces of both the tape and the drive roller 66, tape 65 remains at rest, the frictional force exerted on the tape by the rotating roller 66 being insufficient to overcome the inertia of the tape. When it is desired to put tape 65 in motion, solenoid 74 is energized causing jam roller 69 to quickly assume the running position. When jam roller 69 assumes the running position, as indicated in the figure by dotted lines, tape 65 is squeezed or pressed between the opposing surfaces of the drive and jam rollers thus causing the tape to be rapidly accelerated in the direction indicated by the arrow.

Obviously the drive mechanism of Fig. 6 may be directly substituted for the reverse acceleration rollers and reverse control of the embodiment illustrated in Fig. 1. It is equally clear that a drive mechanism for rapidly accelerating a recording tape from rest to a predetermined constant velocity in either the forward or reverse direction is obtained utilizing two of the mechanisms of Fig. 6.

From the foregoing description it is apparent that the present invention provides a driving mechanism for rapidly accelerating a tape from rest to a predetermined constant velocity which is highly efficient and reliable. It should now be clear that in accordance with the basic concepts of the present invention, the motion of a tape is controlled by a constant momentum drive roller in combination with a constant momentum jam roller. By utilizing constant momentum acceleration rollers, it has been demonstrated that the resulting driving mechanism provides means for substantially instantaneously accelerating a light-weight tape from rest to a predetermined constant running velocity past a transducer. It has been further demonstrated that by utilizing both forward and reverse acceleration rollers designed in accordance with the concepts of the present invention, a tape may be selectively and rapidly accelerated during the above acceleration periods from rest to a predetermined constant velocity past a transducer in either of two directions. By test, it has been found that a tape can be accelerated from rest in 2 milliseconds to a speed of 100" per second, which compares with an acceleration period of 5 to 6 milliseconds of prior art devices.

What is claimed as new is:

1. A tape drive mechanism for rapidly accelerating a tape from rest to a predetermined constant velocity; said drive mechanism comprising: a source of driving power; a drive roller coupled to said source and continuously rotated thereby at a constant peripheral velocity equal to the predetermined constant velocity of the tape, said drive roller having a substantially frictionless peripheral surface in contact with the tape; a freely rotatable jam roller in continuous engagement with said drive roller and continuously rotated thereby, said jam roller including an inner rigid drum and an outer resilient collet, said resilient collet having two parallel extrusions disposed around the circumference thereof to form a rectangular opening between the opposing peripheral surfaces of said rollers having a width greater than the width of the tape and having an undistorted depth greater than the thickness of said tape; and positioning means mechanically coupled to said jam roller for selectively positioning said jam roller in a tape-rest position in light engagement with said drive roller and in a tape-running position in heavy pressure engagement with said drive roller, said pressure engagement being sufficient to cause said two parallel extrusions to be compressed thus reducing the depth of said rectangular opening so as to cause said tape to be squeezed between said jam roller and said drive roller.

2. The tape drive mechanism defined in claim 1 wherein said inner rigid drum has a pair of parallel substantially V-shaped grooves around the circumference thereof, and wherein said outer resilient collet includes a pair of corresponding resilient, annular tires disposed in said pair of grooves in a manner to protrude above the peripheral surface of said inner drum to form said two parallel extrusions.

3. The tape drive mechanism defined in claim 2 wherein said outer resilient collet further includes a resilient pressure pad disposed around the circumference of said inner rigid drum between said pair of grooves.

4. A rapid acceleration tape drive mechanism comprising: driving means; a drive roller coupled to said driving means and continuously rotated thereby; a jam roller in constant engagement with said drive roller and continuously rotated thereby at a peripheral velocity equal to the peripheral velocity of said drive roller, said jam roller including an inner rigid drum and an outer resilient collet having a rectangular channel disposed about the circumference thereof to form a rectangular opening between opposing peripheral surfaces of said drive and jam rollers sufficiently large to permit a tape to rest lightly on the surface of said drive roller within said rectangular opening; and means coupled to said jam roller for forcing said jam roller against said drive roller with sufficient force to distort said resilient collet thereby collapsing said rectangular opening and squeezing said tape between said rollers.

5. A drive mechanism for rapidly and selectively accelerating an elongated medium from rest to a constant, predetermined velocity past a fixed point in a forward or a reverse direction in response to forward and reverse control signals; said drive mechanism comprising: a common drive; forward acceleration apparatus responsive to the forward control signals for accelerating the medium in the forward direction, said forward acceleration apparatus including a forward drive roller coupled to said drive and continuously rotated thereby, said forward drive roller being in continuous contact with said medium, a forward jam roller movable between first and second positions and being coupled to said drive to be rotated thereby in each of said first and second positions, said forward jam roller having a peripheral surface disposed parallel to and spaced from said forward drive roller in said first position, and forward positioning means coupled to said forward jam roller and responsive to said forward control signals for moving said forward jam roller from said first position to said second position with said peripheral surface in pressure engagement with said forward drive roller and said medium, thereby causing said medium to be accelerated in the forward direction; and reverse acceleration apparatus responsive to the reverse control signals for accelerating the medium in the reverse direction, said reverse acceleration apparatus including a reverse drive roller coupled to said drive and continuously rotated thereby, said reverse drive roller being in continuous contact with said medium, a reverse jam roller movable between first and second positions and being coupled to said drive to be rotated thereby in each of said first and second positions, said reverse jam roller having a peripheral surface disposed adjacent and parallel to said reverse drive roller in said first position, and reverse positioning means coupled to said reverse jam roller and responsive to the reverse control signals for moving said reverse jam roller from said first position to said second position with said peripheral surface of said reverse jam roller in pressure contact with said reverse drive roller and said medium, thereby causing said medium to be accelerated in the reverse direction.

References Cited in the file of this patent

UNITED STATES PATENTS

| | | |
|---|---|---|
| 963,828 | Swift | July 12, 1910 |
| 1,586,719 | Swab | June 1, 1926 |
| 1,998,931 | Kellogg | Apr. 23, 1935 |
| 2,164,919 | Harmon | July 4, 1939 |
| 2,276,494 | Kellogg | Mar. 17, 1942 |
| 2,514,261 | Scheffey | July 4, 1950 |
| 2,624,574 | Camras | Jan. 6, 1953 |
| 2,706,116 | Koch | Apr. 12, 1955 |